United States Patent [19]

Beard et al.

[11] Patent Number: 5,062,022
[45] Date of Patent: Oct. 29, 1991

[54] PAD-MOUNTED SWITCHGEAR WITH COMBINATION LIVE FRONT AND DEAD FRONT TERMINATIONS AND TWO OBSERVATION WINDOWS PERMITTING VISUAL INSPECTION OF THE SWITCH ASSEMBLY

[75] Inventors: Lloyd R. Beard, Centralia; John A. Schwartze, Columbia, both of Mo.

[73] Assignee: A. B. Chance Co., Centralia, Mo.

[21] Appl. No.: 485,257

[22] Filed: Feb. 26, 1990

[51] Int. Cl.$^5$ .............................................. H02B 7/00
[52] U.S. Cl. ................................... 361/335; 361/340
[58] Field of Search ............... 361/331, 334, 335, 340, 361/347, 357, 390, 428, 429

[56] References Cited

FOREIGN PATENT DOCUMENTS 3813003  8/1989  Fed. Rep. of Germany ...... 361/334

OTHER PUBLICATIONS

"Westinghouse Metal Enclosed Switchgear", Section 221, pp. 22-134 and 22-135, Oct. 1930.

Belgelectro-Export (Belgium), No. 35, Dec. 1977, pp. 16-20.

*Primary Examiner*—Leo P. Picard
*Assistant Examiner*—Michael W. Phillips
*Attorney, Agent, or Firm*—Hovey Williams Timmons & Collins

[57] ABSTRACT

An electrical switchgear apparatus for use in selectively connecting a primary power line with a tap power line includes a housing in which a switch assembly is disposed. The housing includes a source side wall and a tap side wall generally opposed to the source side wall, and conductors extend through each of the source and tap side walls. A live front terminator is electrically connected with the source side conductor and is adapted to be connected with the primary power line, while a dead front terminator electrically connects with the second insulated conductor and is adapted to be connected with the tap power line. A dead front enclosure surrounds the insulated conductors, the live front terminator, and the dead front terminator. Observation windows in the source side wall and in the dead front enclosure permit visual inspection of the switch assembly from outside of enclosure.

8 Claims, 3 Drawing Sheets

PAD-MOUNTED SWITCHGEAR WITH COMBINATION LIVE FRONT AND DEAD FRONT TERMINATIONS AND TWO OBSERVATION WINDOWS PERMITTING VISUAL INSPECTION OF THE SWITCH ASSEMBLY

BACKGROUND OF THE INVENTION

1. Field of the Invention

The present invention relates generally to electrical switchgear and, more particularly, to a pad-mounted electrical switchgear apparatus including a combination of terminators for connecting the apparatus to power lines of an electrical distribution system.

2. Discussion of the Prior Art

It is known to provide underground transmission and distribution systems which permit electrical power to be distributed to residential and commercial areas without detracting from the aesthetic appearance of the surroundings. In order to provide such underground systems, pad-mounted electrical devices such as switchgear and transformers have been developed for use in underground systems which are capable of handling relatively heavy electrical loads.

One known type of pad-mounted switchgear apparatus in present use in underground distribution systems includes an air-insulated housing enclosing a switchgear assembly, a plurality of insulated conductors extending through the housing on the source and load sides thereof, and a number of dead front cable terminators for connecting the conductors to the source side or primary power lines and the tap side or tap power lines.

As is conventional in the field of switchgear construction, the term dead front is used to define any assembly so constructed that there are no exposed live parts on the front of the assembly. In the known switchgear apparatus, each of the dead front terminators include a rubber insulated T-shaped connector and an associated "plug-in" type bushing, which together permit the terminator to be easily unplugged from the insulated conductor to permit servicing of the switchgear.

Another conventional switchgear apparatus includes the use of a switchgear assembly similar to that provided in the previously discussed apparatus, but constructed with live front terminators positioned between the insulated conductors and the primary and tap power lines. As is conventional in the field of switchgear construction, the term live front is used to define any assembly so constructed that there are exposed live parts on the front of the assembly. The live front terminators typically include exposed, energized connectors fastened to the insulated conductors and separated from the public by an enclosure to prevent inadvertent contact with the connectors.

Certain benefits and drawbacks exist with each of these known types of switchgear constructions. For example, with reference to the dead-front-terminator constructions, expensive rubber insulated T-shaped connectors are required which represent a substantial expense, especially with respect to the connectors used on the source side which must be rated to carry the relatively high currents, e.g. 600 amperes, typically carried in the primary power lines of the distribution system, e.g. a 25 kV system.

With regard to the live-front-terminator constructions, the cost of the connectors is reduced since no expensive insulators are used and no grounding or shielding provisions are made. However, in these constructions, a problem exists in that the terminators are not shielded and are energized such that a potential danger is presented to linemen working in the vicinity of the terminators. A cover is frequently provided to shield the live front terminators of these constructions, but such shields must be removed from the apparatus in order to confirm the position of the switchgear within the housing. Thus, a danger is still presented to a lineman once the cover is removed.

OBJECTS AND SUMMARY OF THE INVENTION

It is an object of the present invention to provide a pad mounted switchgear apparatus in which the advantages of dead front terminators may be realized along with the benefits of live front terminators, such that the apparatus presents no potential danger of exposure to energized and non-shielded components.

In accordance with this and other objects evident from the present disclosure, a switchgear apparatus constructed in accordance with one aspect of the invention includes a housing having a source side wall and a tap side wall generally opposed to the source side wall, a first insulated conductor extending through the source side wall, and a second insulated conductor extending through the tap side wall. A switch assembly is disposed within the housing and includes a first switch contact electrically connected with the first insulated conductor and a second switch contact electrically connected with the second insulated conductor. The first and second switch contacts are relatively movable between an open, current-interrupting position and a closed, current-carrying position.

According to this construction of the invention, a live front terminator electrically connects with the first insulated conductor and is adapted to be connected with the primary power line, while a dead front terminator is electrically connected with the second insulated conductor and is adapted to be connected with the tap power line. A dead front enclosure surrounds the insulated conductors, the live front terminator, and the dead front terminator.

By this arrangement, numerous advantageous results are realized. For example, by providing dead front terminators adjacent the tap power lines, the tap side of the housing is made easily accessible to a lineman attempting to service the switchgear. Such a provision is beneficial where, as is common, a fuse or interrupter is disposed within the switchgear housing adjacent the tap side wall thereof. The provision of an easily removable terminator permits the tap side wall of the housing to be freed for movement to permit access to the fuse or interrupter so that it may be replaced or repaired.

Another advantage realized from the present invention resides in the use of relatively inexpensive, live front terminators adjacent the source side of the switchgear housing where the relatively large primary power lines are disposed. By constructing the apparatus in this manner, the live front terminators are located in a position which requires less attention than the tap side of the apparatus due to the infrequent need for linemen to access the switch assembly that is conventionally located adjacent the source side wall of the housing. Thus, because the source side wall is required to be accessed only relatively infrequently, the use of the live front terminators at the source side of the housing does not significantly effect the utility of the apparatus.

Although the use of live front terminators at the source side of the apparatus could represent a potential danger where incidental contact with the terminators is possible, it is an object of the present invention to provide for the use of such terminators in a safe, shielded, dead front enclosure which permits a visual verification to be made of the switchgear components prior to any exposure to live, energized components being possible.

In accordance with this object, the present invention provides a dead front enclosure surrounding the first insulated conductor and the live front terminator. The enclosure includes a first grounded panel including a window and being movable between a closed position shielding the first insulated conductor and the live front terminator, and an open position exposing the first insulated conductor and the live front terminator, and a second grounded panel movable between a closed position shielding the first grounded panel, and an open position exposing the first grounded panel. The enclosure remains dead front and the switch assembly is visible through both the window of the first panel and a window in the source side wall, when the first grounded panel is in the closed position and the second grounded panel is in the open position.

Thus, although live front terminators are used at the source side of the apparatus, means are provided for ensuring that the apparatus is dead front during the time that a lineman operates the switchgear and visually confirms that the switchgear has moved to an open position.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figure 1:
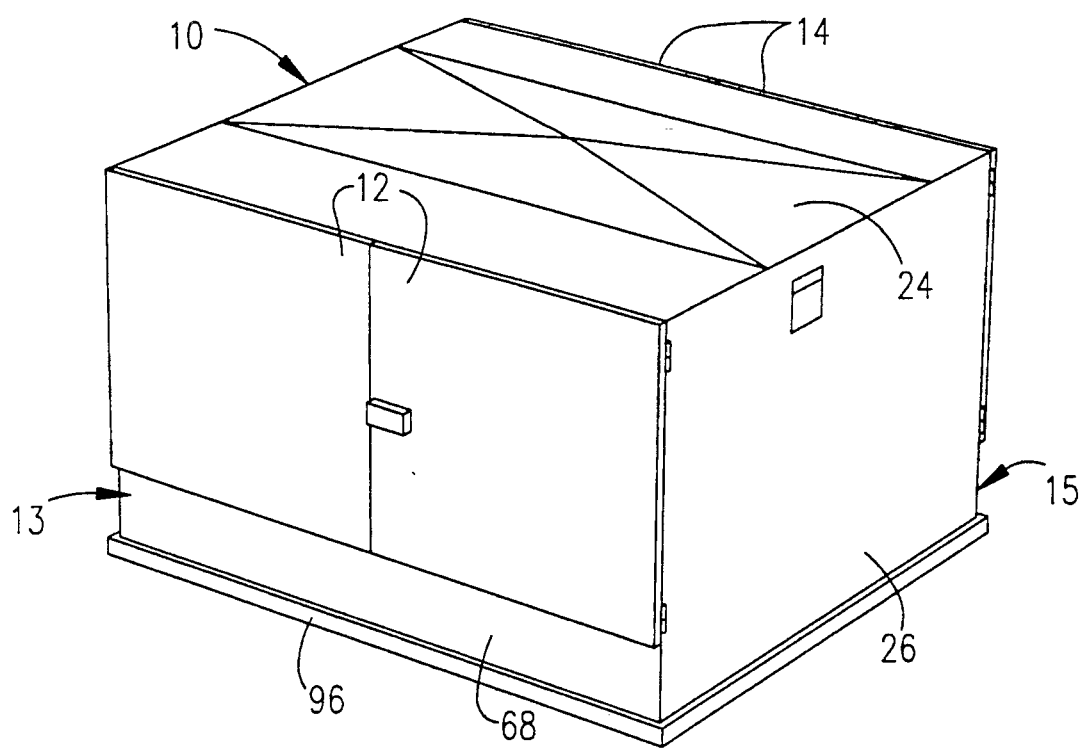
FIG. 1 is a perspective view of a pad-mounted switchgear apparatus constructed in accordance with the invention.

A pad-mounted switchgear apparatus is illustrated in FIG. 1, and includes an enclosure 10 provided with a pair of source side closure panels 12 located on a source side 13 of the enclosure, and a pair of tap side closure panels 14 located at a tap side 15 of the enclosure. All of the closure panels 12, 14 are capable of being locked in the closed position shown to prevent tampering with the switchgear components enclosed therein. Further, the closure panels may be unlocked in a conventional manner and opened to expose the interior of the enclosure 10 and permit access to the components for repair and/or replacement.

Figure 2:
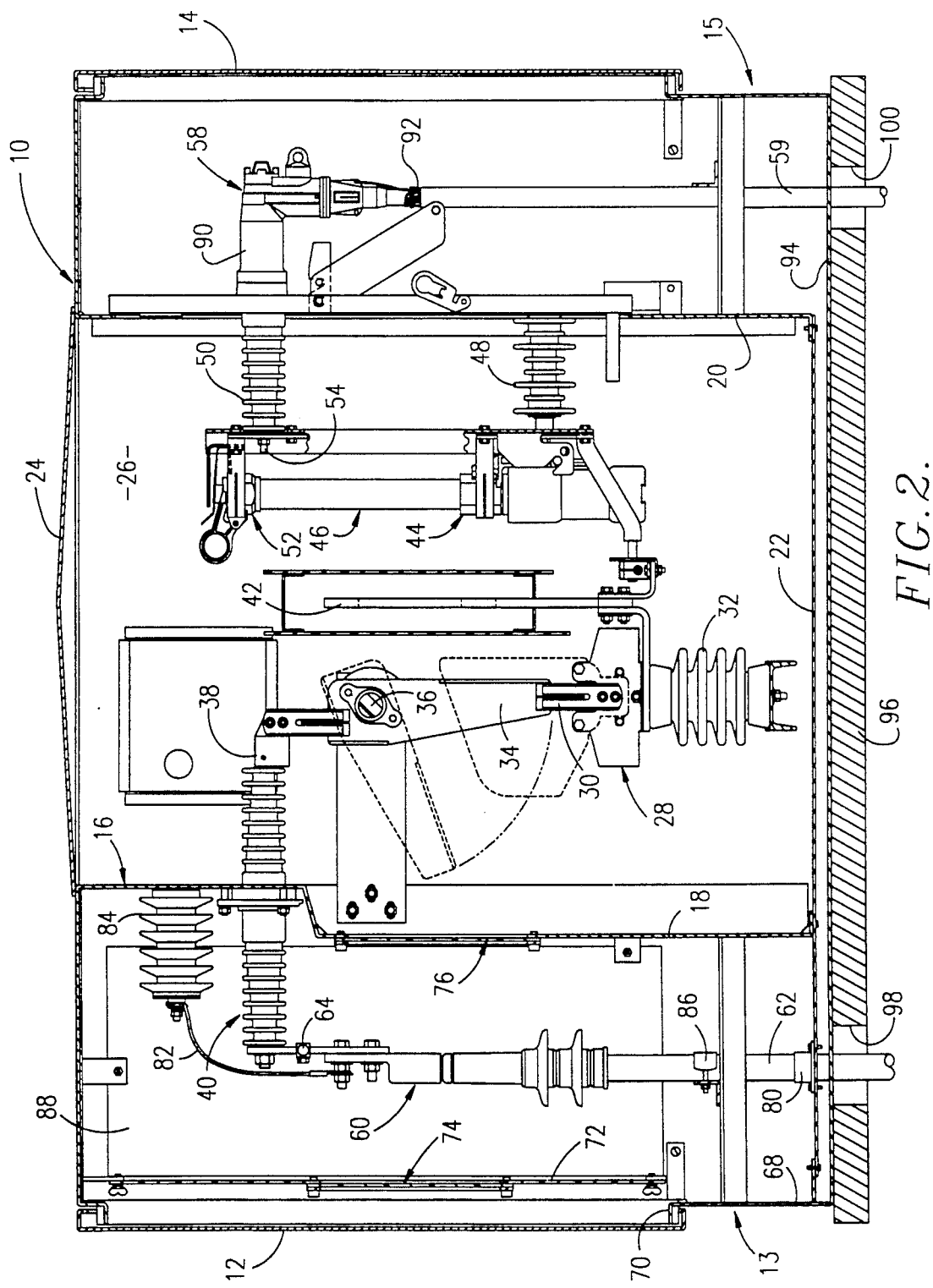
FIG. 2 is a side sectional view of the switchgear apparatus.

The construction of the switchgear apparatus is depicted in FIG. 2, as including a housing 16 defined by a source side wall 18, a tap side wall 20, a raised floor 22, a roof 24, and a pair of lateral side walls 26, one of which is shown in FIG. 1. The housing 16 is substantially airtight and the interior thereof is airinsulated, although it is also possible to employ the present invention with switchgear devices insulated with other known dielectric materials.

Figure 3:
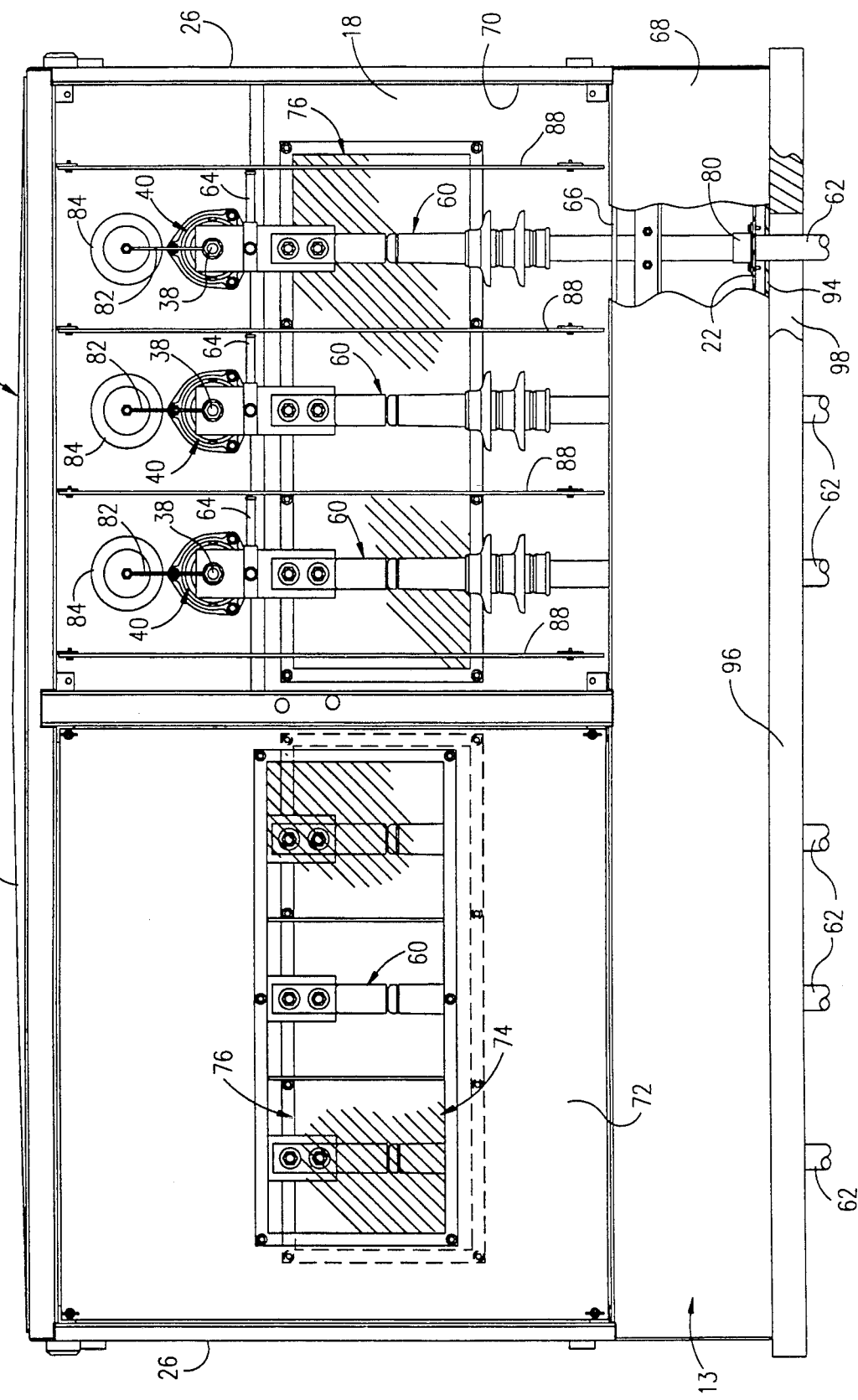
FIG. 3 is a front view, partially cut away, of the source side of the apparatus with the source side closure panels removed from both the left-hand and right-hand sides of the enclosure and with the outer grounded panel removed from the right-hand side of the enclosure.

In the preferred embodiment, the enclosure 10 houses two three-phase switchgear assemblies in a side-by-side arrangement as shown in FIG. 3, to permit the switchgear apparatus to be used in a loop-type distribution system. However, in order to discuss the construction of the invention, only the components associated with one of the phase lines are shown and discussed with reference to FIG. 2, with the understanding that a similar arrangement is provided for each of the three phase lines of each three-phase assembly of the apparatus.

A switchgear assembly 28 is provided within the housing 16 and includes a fixed contact 30 supported on an insulator 32, and a movable contact 34 supported on a rotatable shaft 36 for pivotal movement about the longitudinal axis of the shaft between a closed position in which the movable contact engages and makes electrical contact with the fixed contact 30, and an open position, shown in phantom lines in FIG. 2, in which the movable contact 34 is isolated from the fixed contact. The mechanism for rotating the rotatable shaft does not form a part of the present invention, but it is understood that any conventional switch operating means may be employed.

The movable contact 34 is connected adjacent the upper end thereof to a conductor 38 extending axially within a one-piece, air-to-air bushing 40 which extends through the source side wall 18 of the housing 16 and which is bolted or otherwise fastened in place relative to the wall 18.

The fixed contact 30 is in electrical communication with a U-shaped bus conductor 42 connecting the fixed contact with a corresponding contact within an adjacent three-phase switchgear assembly which is provided in the same enclosure to permit alternate routing of power through either of the two three-phase assemblies in a known manner. The fixed contact 30 also is in electrical communication with a first contact 44 of a fuse or interrupter 46 that is mounted to the inside of the tap side wall 20 on an insulator 48 and on a bushing 50. The fuse or interrupter 46 is of conventional construction and includes a second contact 52 that is normally in current-carrying communication with the first contact 44 and that is connected with a conductor 54 extending within the bushing 50. The conductor 54 terminates at a female connection point of conventional construction, not shown, which permits the conductor to be connected with a terminator 58 that is interposed between the conductor 54 and a tap power line 59.

At the source side 13 of the enclosure 10, a live front terminator 60 is provided which serves as an electrical connection between the conductor 38 and an incoming primary power line 62. Although means are provided on the live front terminator 60 for grounding the terminator, the terminator is normally neither shielded nor grounded. The means for permitting grounding of the terminator 60 includes a ground stud 64 connected to the terminator 60 and a ground rod 66 provided on the enclosure 10. The stud 64 and rod 66 may be connected in a conventional fashion by a ground cable, not shown, that may be fitted between the stud and rod to ground the terminator 60.

A portion of the enclosure 10 surrounds the live front terminators 60, the portion including extensions of the lateral side walls 26 and the roof 24, the raised floor 22, the source side wall 18 of the housing 16, and a front wall 68 having a relatively large opening therein 70. One of the source side closure panels 12 covers the opening 70 when closed, and an outer grounded panel 72 is disposed within the opening and forms a substantially airtight connection with the front wall 68 so that, even when the closure panel 12 is removed, the opening 70 is substantially sealed to prevent airflow therethrough.

The outer grounded panel 72 is removably fastened in the opening 70 and includes a window 74 through which the space interior of the outer grounded panel 72 is visible. The source side wall 18 of the housing also includes a window 76 generally aligned with the window 74 of the outer panel 72 so that the switchgear assembly 28 within the housing 16 may be viewed from outside the outer panel 72. By this provision, it is possible for a lineman to visually inspect the switchgear assembly 28 by removing the closure panel 12 and looking through the windows 74, 76 into the housing 16, and the lineman is not exposed to live, unshielded components of the live front terminators 60.

The space interior of the outer grounded panel 72 and exterior of the housing 16 is further insulated against airflow therethrough by the raised floor 22 which extends across the entire bottom area of the space and includes an opening for receiving one of the primary power lines 62. A seal 80 is provided adjacent each opening for sealing the opening around the power line to prevent air from entering or exiting through the opening.

A lightning arrestor 84 is attached to the outer surface of the source side wall 18 of the housing 16 and is connected to the live front terminator 60 with a cable lead 82. Also, a cable support bracket 86 may be provided to secure the power line in position within the enclosure 10. Also, insulated barriers 88 are disposed between each of the terminators 60 to protect against flashover between the terminators 60.

At the tap side 15 of the apparatus, the terminator 58 is shown as being a L-shaped, dead front terminator including a male plug conductor adapted to be fitted in the female plug member of the insulated conductor 54 in such a manner as to permit ready removal of the terminator 58 from the conductor 54. The L-shaped terminator 58 is of conventional construction, preferably including an insulated molded rubber connector 90 and being enclosed by a ground shield 92 such that when the tap side closure panels 14 are opened, the conductors 54 and terminators 58 are grounded to prevent a human from being shocked in the event of making incidental contact with those components.

Beneath the raised floor 22 of the enclosure 10, a support floor 94 is provided upon which the apparatus rests. The support floor 94 is positionable on any suitable pad 96, shown in FIG. 3, such as on a poured pad of concrete having a pair of slots 98, 100 or a number of holes therein for receiving the primary and tap power lines 62, 59.

Normally, when a fault occurs which causes interruption of the current through the switchgear apparatus, it is not necessary for a lineman to enter the source side 13 of the apparatus for any reason other than to confirm that the switchgear assembly 28 is in the desired position prior to proceeding.

In order to carry out this confirmation, the lineman must remove the source side closure panels 12 as is shown on the left-hand side of FIG. 3, and visually inspect the switchgear assembly, not shown in FIG. 3, through the window 74 of the outer grounded panel 72 and the window 76 of the source side wall 18 of the housing 16. During this time, the enclosure 10 and the outer grounded panel 72 are dead front such that there is no danger of the lineman making contact with a live energized component of the apparatus.

Once the lineman has confirmed visually that the switchgear assembly 28 is in the desired position, he or she then opens the tap side closure panels 14 without any risk of exposure to live front components, and carries out the repair/replacement of the fuse or interrupter 46 in a conventional manner. Thereafter, the tap side closure panels 14 are replaced and locked, the switchgear assembly 28, if open, is returned to a closed, current-carrying position that is visually confirmed through the windows 74, 76, and the source side closure panels 12 are replaced and locked.

If it is necessary to work on the switchgear assembly 28 or the primary power line 62, and thus to gain access to the interior of the housing 16 through the source side wall 18, or to the primary power line, then the same steps are carried out as discussed above for ensuring that the switchgear assembly 28 is first in an open position. Thereafter, the outer grounded panel 72 may be removed, a check for no voltage on terminator 60 using a conventional volt meter made, and a ground cable, not shown, placed on the ground stud 64 of each terminator 60 and the ground rod 66. Only during the limited time after removal of the outer grounded panel 72 and prior to grounding of the terminators 60 is the lineman exposed to the live front terminators. Because such situations arise so infrequently, there is less of an opportunity that the lineman will make incidental contact with the live front terminators 60 than in known live front switchgear devices using live front terminators on both the source side and the tap side of the enclosure.

Although the invention has been described with reference to the preferred embodiment illustrated in the attached drawing, it is noted that substitutions may be made and equivalents employed herein without departing from the scope of the claims.

What is claimed is:

1. An electrical switchgear apparatus for use in selectively connecting a primary power line with a tap power line, the apparatus comprising:

a housing having a source side wall and a tap side wall generally opposed to the source side wall;

a first insulated conductor extending through the source side wall;

a second insulated conductor extending through the tap side wall;

a switch assembly disposed within the housing and including a first switch contact electrically connected with the first insulated conductor and a second switch contact electrically connected with the second insulated conductor, the first and second switch contacts being relatively movable between an open, current-interrupting position and a closed, current-carrying position;

a live front terminator electrically connected with the first insulated conductor and including means for permitting the live front terminator to be connected with the primary power line;

a dead front terminator electrically connected with the second insulated conductor and including means for permitting the dead front terminator to be connected with tap power line; and a dead front enclosure surrounding the switch assembly, the insulated conductors, the live front terminator, and the dead front terminator, the source side wall including inspection means for permitting a vision inspection of the switch assembly from outside the housing, the dead front enclosure including a window through which the inspection means and the switch assembly are visible, the window being movable between a closed position shielding the live front terminator, and an open position exposing the live front terminator.

2. The electrical switchgear apparatus as recited in claim 1, further comprising a grounded panel supported on the dead front enclosure movable between a closed position shielding the first grounded panel and an open position exposing the first grounded panel.

3. The electrical switchgear apparatus as recited in claim 1, wherein the dead front enclosure is substantially airtight when the first grounded panel is in the closed position.

4. The electrical switchgear apparatus as recited in claim 1, wherein the dead front enclosure includes a tap side panel movable between a closed position shielding the dead front terminator and an open position exposing the dead front terminator.

5. The electrical switchgear apparatus as recited in claim 1, for use in connecting three primary power lines of a three phase electrical distributing system with three tap power lines, wherein:

three of the first insulated conductors extend through the source side wall and three of the second insulated conductors extend through the tap side wall, the switch assembly including a first switch contact electrically connected with each of the first insulated conductors and a second switch contact electrically connected with each of the second insulated conductors, each of the pair of first and second switch contacts being relatively movable between an open, current-interrupting position and a closed, current-carrying position;

three live front terminators are provided, each being electrically connected with one of the first insulated conductors and including means for permitting the live front terminator to be connected with one of the primary power lines; and three dead front terminators are provided, each being electrically connected with one of the second insulated conductors and including means for permitting the dead front terminator to be connected with one of the tap power lines.

6. A switchgear apparatus comprising:

a housing having a source side wall which includes a first window;

an insulated conductor extending through the source side wall;

a switch assembly disposed within the housing and electrically connected to the insulated conductor;

a live front terminator electrically connected with the source side insulated conductor;

a dead front enclosure surrounding the live front terminator, the enclosure including, a first grounded panel including a second window and being movable between a closed position shielding the live front terminator, and an open position exposing the live front terminator, and a second grounded panel movable between a closed position shielding the first grounded panel, and an open position exposing the first grounded panel, the enclosure remaining dead front and the switch assembly being visible through the first and second windows when the first grounded panel is in the closed position and the second grounded panel is in the open position.

7. The switchgear apparatus as recited in claim 6, wherein a space is defined within the dead front enclosure between the source side wall and the first grounded panel, the space being substantially airtight when the first grounded panel is in the closed position.

8. The switchgear apparatus as recited in claim 7, further comprising a floor extending between the source side wall and the first grounded panel, the floor including a hole adapted to receive an electrical power line and sealing means for sealing the hole to prevent airflow through the hole.

* * * * *